Figure 1:
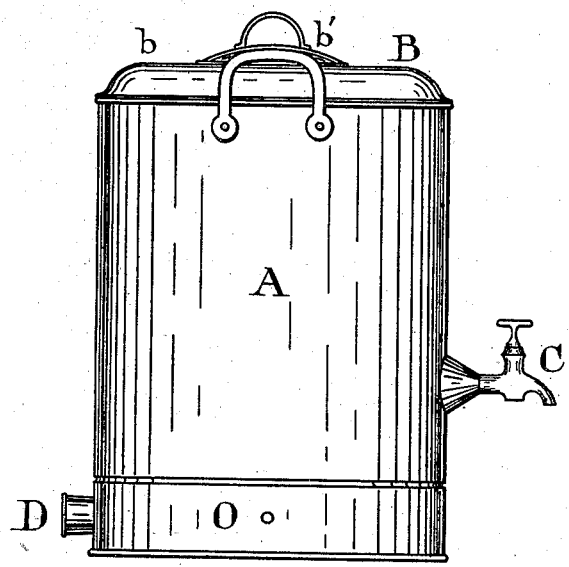

(No Model.)

2 Sheets—Sheet 1.

A. FISKE.
FILTERING APPARATUS.

No. 264,870. Patented Sept. 26, 1882.

WITNESSES:

INVENTOR:
Allen Fiske
by
Clifford & Clifford
His Atty (No Model.)  2 Sheets—Sheet 2.

A. FISKE.
FILTERING APPARATUS.

No. 264,870. Patented Sept. 26, 1882.

WITNESSES:  INVENTOR:
Allen Fiske
by
Clifford & Clifford
His Atty

UNITED STATES PATENT OFFICE.

ALLEN FISKE, OF PORTLAND, MAINE, ASSIGNOR OF ONE-FOURTH TO SEPTIMUS L. FISK, OF BOSTON, MASSACHUSETTS.

FILTERING APPARATUS.

SPECIFICATION forming part of Letters Patent No. 264,870, dated September 26, 1882.

Application filed May 1, 1882. (No model.)

*To all whom it may concern:*

Be it known that I, ALLEN FISKE, of Portland, in the county of Cumberland and State of Maine, have invented certain new and useful Improvements in Filtering Apparatus; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to improvements in filtering apparatus in which the water to be filtered is carried upward through the filter; and the object of my invention is to produce, first, a filter in which the purified water is delivered from below as in nature, leaving the sediment in a receptacle beneath; second, to make especial provision for cleansing the filter. I attain these objects by the means described hereinafter and shown in the drawings.

Figure 2:
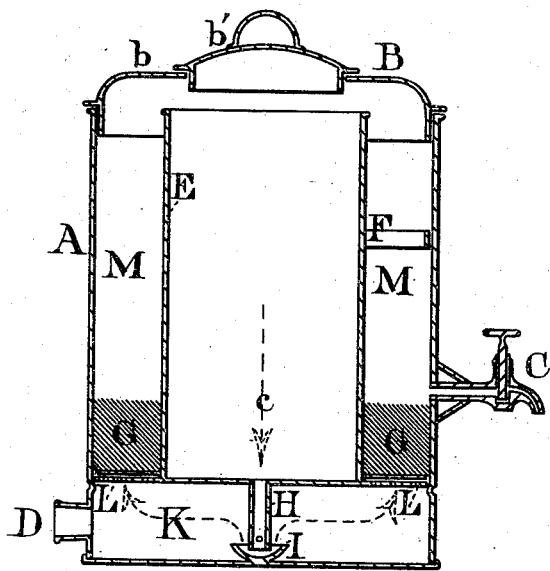
Figure 3:
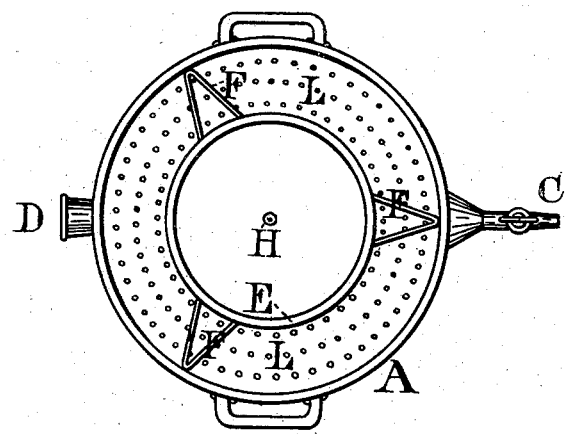

Figure 1 shows the exterior of my device. Fig. 2 is a vertical section. Fig. 3 is a top view with the covers removed.

Similar letters refer to similar parts throughout the several views.

A represents the body of an ordinary vessel suited to the purposes of my device.

B is a cover made in two parts, $b\ b'$.

C is a common faucet from which to draw the filtered water.

D is a tube from which to remove sediment in cleansing the filter.

E is a vessel within A, in which is held the water which is to be filtered.

F F F are braces or supports attached to the vessel E.

G G is the filtering material.

H is a tube at the bottom of the vessel E.

I is a cup at the bottom of the tube H.

K is a chamber between the bottom of the vessel E and the bottom of A.

L is a netting or perforated support for the filtering material to rest upon.

In the use of my device, the small cover $b'$ being taken off, the water which is to be filtered is poured through the aperture made into the vessel E. This water descends in the direction indicated by the arrow $c$ through the tube H into the chamber K. When the chamber K is filled the water will be forced by the pressure of that descending from the vessel E up through the netting or perforated support L, and enter and pass through the filtering material G, and rise above G into the space M, which is between the walls of the two vessels A and E, and occupy that space at a level with the water in the vessel E. This filtered water in the space M is drawn for use through the faucet C.

In my device any common filter may be used, such as sand. It is placed, as indicated at G, around the outside of the vessel E, resting upon the perforated support L, and is introduced into its place by taking off the portion of the cover B which is marked $b$, where the space M between the two vessels A and E will be open and accessible. This support L may be of one piece with the bottom of the vessel E, and in that case the walls of E only rest upon this support L, without being fastened thereto in any way; or the vessel E may be rigidly connected with L, and the two together, when there is occasion, may be drawn up out of the vessel A.

The use of the cup I is more especial in the act of cleansing the chamber K. In order to cleanse this chamber, the plug which closes the opening D is removed, the two vessels A and E now containing water. This water descends from each. That from E, coming through the tube H, strikes into the cup I, is agitated as it is thrown out, and beats about and up against the bottom of E, and thus assists in the removal of any sediment that may have fastened upon the walls of the chamber K. The water in the space M descends through the filter G, and brings down sediment, if any there, into the chamber K, and passes out through the tube D. The braces F F are attached to the vessel E, and extend to the walls of the vessel A, and act as props to hold the vessel E secure and steady in its position within A.

It is obvious that the water which is to be filtered may be introduced into the chamber K, if desired, by attaching a pipe at the side of this chamber, as at O, and making a connection with the water-works of any town, for instance, or in any way producing a continued flow of water slowly through my device by adjusting the faucet so as to permit a small stream to run away.

The vessel E may be made about one-half the diameter of that of A.

It will be seen that in my device the water in passing upward through the filter from the chamber K is delivered into the space M in the manner of a boiling spring in nature.

What I claim as my invention, and desire to secure by Letters Patent, is—

1. The vessel A and cup I, in combination with the interior vessel, E, having the tube H, the cup I being arranged below the tube H, whereby the water is agitated in passing out of said tube, as set forth.

2. A water-filter consisting of the following parts, to wit: a cover, B, composed of two parts, $b$ $b'$, an exterior vessel, A, having the bottom chamber, K, the interior chamber, E, the filtering material G, the netting L, the cup I, and the tube D, all combined and arranged as set forth, so that the filter can be filled and also readily cleaned, as shown.

In testimony that I claim the foregoing as my own I affix my signature in presence of two witnesses.

ALLEN FISKE.

Witnesses:
CHARLES E. CLIFFORD,
CHAS. H. FLING.